United States Patent [19]

Zandona

[11] Patent Number: 5,763,349

[45] Date of Patent: *Jun. 9, 1998

[54] SOLID PRECURSOR OF A CATALYTIC SYSTEM FOR THE POLYMERIZATION OF OLEFINS, PROCESS FOR ITS PREPARATION, CATALYTIC SYSTEM COMPRISING THIS SOLID PRECURSOR AND PROCESS FOR THE POLYMERIZATION OF OLEFINS IN THE PRESENCE OF THIS CATALYTIC SYSTEM

[75] Inventor: Nicola Zandona, Waterloo, Belgium

[73] Assignee: Solvay Polyoléfins Europe - Belgium, Brussels, Belgium

[*] Notice: The term of this patent shall not extend beyond the expiration date of Pat. No. 5,496,782.

[21] Appl. No.: 606,686

[22] Filed: Feb. 15, 1996

Related U.S. Application Data

[63] Continuation of Ser. No. 202,119, Feb. 25, 1994, abandoned.

[30] Foreign Application Priority Data

Mar. 1, 1993 [BE] Belgium ............... 09300191

[51] Int. Cl.$^6$ ............... C08F 4/634; C08F 4/631; C08F 10/00
[52] U.S. Cl. ............... 502/104; 502/103; 502/113; 502/117; 502/120; 502/152; 502/154; 526/114; 526/116; 526/119; 526/124.6; 526/904; 526/943; 526/352
[58] Field of Search ............... 502/152, 155, 502/104, 103, 113, 117, 120, 154

[56] References Cited

U.S. PATENT DOCUMENTS

| | | | |
|---|---|---|---|
| 5,183,867 | 2/1993 | Welborn | 526/114 |
| 5,266,544 | 11/1993 | Tsutsui et al. | 526/114 |
| 5,278,119 | 1/1994 | Turner et al. | 526/126 |
| 5,369,196 | 11/1994 | Matsumoto et al. | 526/160 |
| 5,496,782 | 3/1996 | Zandona | 502/103 |

FOREIGN PATENT DOCUMENTS

| | | |
|---|---|---|
| 0002521 | 6/1979 | European Pat. Off. . |
| 0426638 | 5/1991 | European Pat. Off. . |
| 0500944 | 9/1992 | European Pat. Off. . |
| 0552581 | 1/1993 | European Pat. Off. . |

*Primary Examiner*—Edward J. Smith
*Attorney, Agent, or Firm*—Spencer & Frank

[57] ABSTRACT

Solid precursor of a catalytic system for the polymerization of olefins, containing at least one neutral halogenated metallocene derived from a transition metal, the latter being linked to at least one halogen atom, and at least one ionizing agent.

Process for the preparation of this solid precursor, according to which a compound based on the neutral halogenated metallocene is mixed with a compound based on the ionizing agent in a heterogeneous medium. Catalytic system comprising an organometallic compound derived from a metal chosen from groups IA, IIA, IIB, IIIA and IVA of the Periodic Table, and a solid precursor described above. Process for the polymerization of olefins, in which this catalytic system is used.

30 Claims, No Drawings

SOLID PRECURSOR OF A CATALYTIC SYSTEM FOR THE POLYMERIZATION OF OLEFINS, PROCESS FOR ITS PREPARATION, CATALYTIC SYSTEM COMPRISING THIS SOLID PRECURSOR AND PROCESS FOR THE POLYMERIZATION OF OLEFINS IN THE PRESENCE OF THIS CATALYTIC SYSTEM

This application is a continuation of application Ser. No. 08/202,119, filed Feb. 25, 1994, now abandoned.

FIELD OF THE INVENTION

The present invention relates to a solid precursor of a catalytic system which may be used for the polymerization of olefins, in particular a solid precursor comprising a metallocene. It also relates to a process for the preparation of this solid precursor, a catalytic system comprising this precursor and a process for the polymerization of olefins in the presence of this catalytic system.

TECHNOLOGY REVIEW

Patent Application EP-426,638 (FINA TECHNOLOGY INC.) discloses a process for the polymerization of olefins in the presence of a metallocene-type catalyst in the ionized state, obtained by mixing a solution of an ionizing agent, such as a solution of triphenylcarbenium tetrakis (pentafluorophenyl)borate in toluene, with a solution of a neutral metallocene which is alkylated and derived from a transition metal (for example a solution of bis (cyclopentadienyl)dimethylzirconium in toluene). These neutral alkylated metallocene have the disadvantages of being unstable and difficult to prepare and to store. Moreover, these known catalysts are particularly unstable and, during their use for the polymerization of olefins, have an activity which rapidly decreases from the moment of their preparation.

The preparation of these catalysts may be simplified, as described in Patent Application EP-0,500,944-A1 (MITSUI TOATSU CHEMICALS INC.), by selecting among the neutral metallocene those which are halogenated, by first of all reacting an organoaluminium compound with the neutral halogenated metallocene in an aromatic solvent, and in subsequently ionizing the product thus obtained by means of an ionizing agent. To this end, there are successively introduced into the polymerization reactor: (a) the product of the alkylation reaction between the organoaluminium compound and the neutral halogenated metallocene in an aromatic solvent, (b) the olefin which it is desired to polymerize and (c) the ionizing agent. In this process, the preliminary reaction of alkylation of the neutral halogenated metallocene with the organoaluminium compound in an aromatic solvent is of essential importance for obtaining a catalyst which is stable and active. This known process has the disadvantage of requiring a preliminary treatment of the neutral halogenated metallocene by means of an organoaluminium compound before placing it in contact with the ionizing agent. In addition, since the product of the alkylation reaction of the neutral halogenated metallocene is very unstable, placement of the latter in contact with the ionizing agent must necessarily be carried out in situ in the polymerization reactor.

SUMMARY OF THE INVENTION

The present invention aims to overcome the abovementioned disadvantages by providing a new solid precursor of a catalytic system, the preparation of which is easier and does not require a preliminary treatment of the neutral halogenated metallocene. Another object of the invention is to provide a stable solid precursor which may be prepared beforehand and kept for at least a day (generally longer) before using it for the polymerization of olefins without risk of deactivation. An additional object of the invention is to provide a solid precursor of a catalytic system which makes it possible to obtain olefinic polymers of high average molecular mass, of wide molecular mass distribution and of high apparent specific weight.

DETAILED DESCRIPTION OF THE INVENTION

The invention therefore relates to a solid precursor of a catalytic system for the polymerization of olefins, this precursor containing at least one neutral metallocene derived from a transition metal and at least one ionizing agent, characterized in that the neutral metallocene is essentially in the halogenated state, the transition metal being linked to at least one halogen atom.

An essential characteristic of the solid precursor according to the invention is the halogenated state of the neutral metallocene forming part of the precursor. In the solid precursor according to the invention, the neutral metallocene is commonly chosen from the compounds of formula $(C_p)_a(C_{p'})_b MX_x Z_z$, in which $C_p$ and $C_{p'}$ each denote an unsaturated hydrocarbon radical coordinated to the central atom M, it being possible for the groups $C_p$ and $C_{p'}$ to be linked by a covalent bridge, M denotes the transition metal, which is chosen from groups IIIB, IVB, VB and VIB of the Periodic Table, a, b, x and z denote integers such that $(a+b+x+z)=m$, $x>0$, $z \geq 0$ and a and/or $b \neq 0$, m denotes the valency of the transition metal M, X denotes a halogen, and Z denotes a hydrocarbon radical which may optionally contain oxygen or a silyl radical of formula ($-R_t-Si-R'R''R'''$) in which R denotes an optionally substituted alkyl, alkenyl, aryl, alkoxy or cycloalkyl group containing up to 20 carbon atoms, R', R" and R'" are identical or different and each denote a halogen or an optionally substituted alkyl, alkenyl, aryl, alkoxy or cycloalkyl group containing up to 20 carbon atoms, t denotes 0 or 1.

The transition metal is preferably selected from scandium, titanium, zirconium, hafnium and vanadium. Zirconium is particularly well suited. Each of the groups $C_p$ and $C_{p'}$ advantageously represents an optionally substituted mono- or polycyclic group containing from 5 to 50 carbon atoms linked by conjugated double bonds. As typical examples there may be mentioned the cyclo-pentadienyl, indenyl or fluorenyl radical or a substituted derivative of such a radical, in which at least one hydrogen atom is substituted with a hydrocarbon radical containing up to 10 carbon atoms. It may also be a radical derived from an element chosen from group VA of the Periodic Table, for example nitrogen or phosphorus.

As examples of neutral metallocene of formula $(C_p)_a(C_{p'})_b MX_x Z_z$, in the case where z is equal to 0, there may be mentioned mono- and dihalogenated scandium metallocene such as chlorodi(cyclopentadienyl)scandium and dichloro(indenyl)scandium, mono-, di- and trihalogenated titanium metallocene such as chloro-tri (pentamethylcyclopentadienyl) titanium, dibromo-di (methylcyclopentadienyl)titanium and trichloro(cyclopentadienyl)titanium, mono-, di- and trihalogenated zirconium metallocene such as iodotri (cyclopentadienyl)-zirconium, dibromo(cyclopentadienyl-1-indenyl) zirconium, trichloro(fluorenyl)zirconium, mono-, di- and trihalogenated hafnium metallocene, mono-, di- and trihalogenated vanadium metallocene such as chloro-tri (cyclopentadienyl)vanadium, dichlorodi(ethylcyclopentadienyl) vanadium and trichloro (ethylindenyl) vanadium, and mono- and dihalogenated trivalent chromium metallocene such as dichloro(cyclopentadienyl)chromium.

In the case where z is other than 0 and where Z is a hydrocarbon radical, the neutral metallocene of formula $(C_p)_a(C_{p'})_bMX_xZ_z$ may, for example, be chosen from chloro (cyclopentadienyl) ethylscandium, dibromo(methyl-cyclopentadienyl)butyltitanium, chloro(indenyl)isopropyl-titanium and dichloro(fluorenyl)hexylzirconium.

In the case where z is other than 0 and where Z is a silyl radical of formula (—R,—Si—R' R" R'"), the neutral metallocene of $(C_p)_a(C_{p'})_bMX_xZ_z$ may, for example, be chosen from those containing, as silyl radical, allyl-dimethylchlorosilyl, allylmethyldiethoxysilyl, 5-(dicycloheptenyl) trichlorosilyl, 2-bromo-3-trimethyl-silyl-1-propenyl, 3-chloropropyldimethylvinylsilyl, 2-(3-cyclo-hexenyl) ethyltrimethoxysilyl and diphenylvinylchlorosilyl.

The metallocene which have a covalent bridge connecting the two groups $C_p$ and $C_{p'}$ may be chosen from those of general formula

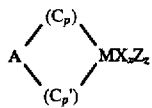

in which A represents an alkylene group which may optionally include oxygen or an optionally halogenated alkenylene, arylalkylene, alkylarylene or arylalkenylene, or a radical derived from an element chosen from groups IIIA, IVA, VA and VIA of the Periodic Table, such as boron, aluminium, silicon, germanium, tin, nitrogen, phosphorus and sulphur. Examples of bridged metallocene which may be mentioned are those corresponding to the formulae

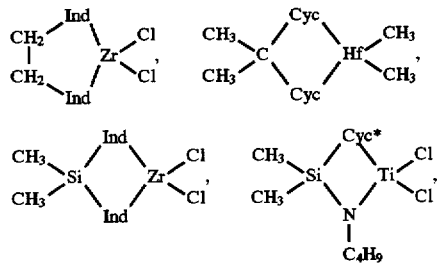

in which Ind represents the indenyl radical, Cyc represents the cyclopentadienyl radical and Cyc* represents the pentamethylcyclopentadienyl radical.

The preferred metallocene of formula $(C_p)_a(C_{p'})_bMX_xZ_z$ are those in which the groups $C_p$ and $C_{p'}$ are chosen from cyclopentadienyl, indenyl and fluorenyl radicals. Good results are obtained with those in which the groups $C_p$ and $C_{p'}$ are linked by a covalent bridge of the alkyl type. The metallocene in which the transition metal is chosen from titanium, zirconium and hafnium are very suitable. Particularly satisfactory results are obtained with the metallocene derived from zirconium.

According to the invention, ionizing agent is understood to denote a compound comprising a first part which has the properties of a Lewis acid and which is capable of ionizing the neutral metallocene, and a second part which is inert towards the ionized metallocene and which is capable of stabilizing the ionized metallocene. The ionizing agent may be an ionic compound comprising a cation having the properties of a Lewis acid, and an anion constituting the second abovementioned part of the ionizing agent. Organoborates are anions which have led is to very good results. Organoborate is understood to denote a boron derivative in which the boron atom is linked to 4 organic substituents. Examples of ionic ionizing agents which may be mentioned are triphenyl-carbenium tetrakis (pentafluorophenyl) borate, N,N-di -methylanilinium tetrakis (pentafluorophenyl) borate and tri (n-butyl) ammonium tetrakis (pentafluorophenyl) borate. The preferred cationic Lewis acids are carbenium, sulphonium and oxonium.

The very particularly preferred ionizing agents are those comprising a cation of carbenium type.

As a variant, the ionizing agent may also be a nonionic compound having the properties of a Lewis acid which is capable of converting the neutral metallocene into a cationic metallocene. To this end, the ionizing agent is itself converted into an anion which is inert towards the cationic metallocene which is capable of stabilizing the latter. Examples of nonionic ionizing agents which may be mentioned are tri (pentafluorophenyl) -boron, triphenylboron, trimethylboron, tri (trimethyl-silyl) borate and organoboroxines.

The ionizing agent is preferably selected from triphenyl-carbenium tetrakis (pentafluorophenyl) borate and tri (pentafluorophenyl) boron.

Triphenylcarbenium tetrakis (pentafluorophenyl) -borate is particularly suitable.

The solid precursor according to the invention commonly comprises:

from 0.1 to 30% by weight of the transition metal, typically from 0.2 to 20% by weight, values from 0.5 to 10% by weight being the most common;

from 1 to 50% by weight of halogen, advantageously from 5 to 30% by weight.

The solid precursor according to the invention should contain the ionizing agent in a sufficient quantity to be able to ionize the greater part (for example at least 80% by weight), preferably all, of the neutral metallocene. The respective optimum quantities of neutral halogenated metallocene and of ionizing agent in the precursor will therefore depend on the metallocene and the ionizing agent selected. In practice, the solid precursor according to the invention advantageously comprises quantities of neutral metalloceone and of ionizing agent in a molar ratio from 0.5 to 2; they are preferably substantially equimolar. Preferably, the weight ratio of the neutral metalloceone to the ionizing agent is from 0.1 to 10, in particular from 0.2 to 2.

The solid precursor according to the invention is generally in the form of a powder with a particle size characterized by:

a mean diameter D of 1 to 500 μm, typically from 2 to 350 μm, values from 5 to 200 being the most common, for example approximately 10 μm;

a standard deviation σ of 5 to 50 μm.

The mean diameter D and the standard deviation σ are defined by the following relationships:

$$D = \frac{\Sigma n_i D_i}{\Sigma n_i} \text{ and } \sigma = \sqrt{\frac{\Sigma n_i (D_i - D)^2}{\Sigma n_i}}$$

where $n_i$ denotes the weight frequency of the particles of diameter $D_i$. The mean diameter D and the standard deviation σ are measured by laser granulometry by means of a MALVERN® MSIZER 20 apparatus. In general, the solid precursor according to the invention is additionally characterized by a specific surface of 50 to 300 m²/g, typically from 80 to 200 m²/g, for example approximately 150, and by a pore volume of 0.1 to 3 cm³/g, for example approximately 1.

According to an advantageous variant of the solid precursor according to the invention, the latter additionally comprises a support, which may be a polymer (such as, for example, polyethylene or polypropylene and their copolymers) or an inorganic support. Examples of inorganic support which may be mentioned are metal halides such as magnesium chloride, metal oxides such as oxides of silicon or aluminium (optionally treated with a fluorine-containing compound), titanium, zirconium, thorium, their mixtures and the mixed oxides of these metals such as aluminium silicate and aluminium phosphate. Silica, alumina, magnesium chloride, aluminium phosphate and the mixtures of silica and magnesium chloride are well suited.

In this advantageous variant of the solid precursor according to the invention, the support is generally present in the state of a powder with a particle size characterized by:

- a mean diameter D of 10 to 1000 μm, typically from 20 to 500 μm, values of 40 to 200 μm being the most common;
- a standard deviation σ of 10 to 50 μm, advantageously from 20 to 40 μm.

In this advantageous variant, the solid precursor according to the invention advantageously comprises the support in a quantity such that the weight ratio of the support to the neutral metallocene is at least equal to 0.1, preferably to 5; it is desirable that this ratio does not exceed 1000, in particular not 100, values in the region of 10 being recommended.

The solid precursor according to this variant of the invention has the advantage of providing catalytic systems which, during their use for the polymerization of olefins, reduce the risks of formation of a crust in the polymerization reactor and allow better control of the morphology of the polymer obtained.

According to another particular variant of the solid precursor according to the invention, the latter also comprises a catalytic compound in addition to the neutral metalloceone and to the ionizing agent. This catalytic compound may be chosen from halides or oxyhalides of a transition metal chosen from groups IVB and VB of the Periodic Table, and among the compounds comprising a transition metal chosen from groups IIIB, IVB, VB and VIB of the Periodic Table, magnesium and a halogen, and which are obtained by mixing a magnesium compound with a transition metal compound and a halogenated compound. The halogen may optionally form an integral part of the magnesium compound or of the transition metal compound. In the case where the halogen does not form an integral part of the magnesium compound or of the transition metal compound, the halogenated compound may, for example, be chosen from halogenated aluminium derivatives such as, for example, ethylaluminium dichloride, dipropylaluminium chloride or aluminium trichloride. The catalytic compound advantageously comprises:

- from 10 to 30% by weight of the transition metal chosen from groups IIIB, IVB, VB and VIB of the Periodic Table, preferably from 15 to 20% by weight, typically approximately 17% by weight,
- from 20 to 50% by weight of the halogen, values from 30 to 40% by weight (for example approximately 40% by weight) being preferred,
- from 0.5 to 20% by weight of magnesium, in general from 0.5 to 20% by weight, values of 1 to 10% by weight, for example approximately 5%, being the most common, the balance generally consisting of elements arising from the products used for their manufacture such as carbon, hydrogen and oxygen.

It may also additionally contain from 0.5 to 20% by weight of aluminium, in general from 0.5 to 5% by weight, values from 1 to 3% being the most common. The transition metal and the halogen are preferably titanium and chlorine.

In this particular variant, the solid precursor advantageously comprises the catalytic compound in a quantity such that the weight ratio of this catalytic compound to the neutral metallocene is at least equal to 0.05, preferably to 0.5; it is desirable that it does not exceed 1000, in particular 100.

It goes without saying that the solid precursor according to the invention may comprise more than one neutral metallocene, more than one ionizing agent and, where appropriate, more than one support and/or more than one catalytic compound.

The solid precursor according to the invention has a particularly high stability and may therefore be prepared in advance and kept without risk of deactivation for at least 24 hours, in general at least a week, typically at least a month. The solid precursor according to the invention has in particular a stability greater than 0.95, defined by the ratio between, on the one hand, the weight of polyethylene obtained on polymerizing, for one hour, ethylene at a partial pressure of 1 bar in the presence of a catalytic system incorporating, in a weight ratio of 0.1 to 10, an organometallic compound and the said precursor which has undergone, after mixing of the neutral halogenated metallocene and the ionizing agent storage for 48 hours at room temperature under nitrogen atmosphere and, on the other hand, the weight of polyethylene obtained on polymerizing, for one hour, ethylene at a partial pressure of 1 bar in the presence of the same catalytic system, in which the precursor has not undergone storage. The invention thus does away with the need to mix the neutral halogenated metallocene and the ionizing agent in situ in the polymerization reactor, at the time of polymerization.

Another subject of the invention is a process for the preparation of a solid precursor of a catalytic system which is suitable for the polymerization of olefins, according to which at least one compound based on a neutral metallocene derived from a transition metal is mixed with at least one compound based on an ionizing agent; according to the invention, the neutral metallocene is in the halogenated state, the transition metal being linked to at least one halogen atom, and the mixing is carried out in a heterogeneous medium.

Heterogeneous medium is understood to denote a medium comprising the compound based on an ionizing agent and the compound based on a neutral metallocene, in which at least 80% (preferably at least 95%) of at least one of these two compounds is in the solid state. This hetero-geneous medium may be essentially solid and obtained by mixing, in the absence of a liquid, the two above-mentioned compounds in the solid state, generally in the state of powders. As a variant, the heterogeneous medium may contain a liquid phase and consist of a suspension comprising an organic liquid in which at least 80% (preferably at least 95%) of at least one of the two compounds (the compound based on an ionizing agent and the compound based on a neutral metallocene) is insoluble. An aliphatic hydrocarbon chosen from linear alkanes (for example n-butane, n-hexane and n-heptane), branched alkanes (for example isobutane, isopentane, isooctane and 2,2-dimethylpropane), and cycloalkanes (for example cyclopentane and cyclohexane) may be used as organic liquid. Monocyclic aromatic hydrocarbons such as benzene and its derivatives, for example toluene, and polycyclic aromatic hydrocarbons, each ring of which may be substituted, are also suitable, so long as they are in a heterogeneous medium such as is defined above.

In the process of preparation according to the invention the neutral metallocene and the ionizing agent conform to those described above. "Compound based on a neutral metallocene" is understood to denote the pure neutral metallocene or a mixed compound comprising the neutral metallocene and at least one other solid substance which is different from the neutral metallocene and the ionizing agent and is inert towards the latter. "Compound based on an ionizing agent" is understood to denote the pure ionizing agent or a mixed compound comprising the ionizing agent and at least one other solid substance which is different from the ionizing agent and the neutral metallocene and is inert towards the latter. These solid substances may be of the polymeric type (such as olefin polymers) or inorganic type (such as metal oxides and metal halides). These respective mixed compounds may, for example, be obtained by mechanical mixing in the solid state of the neutral metallocene or of the ionizing agent with the solid substance. As a variant, they may be obtained by impregnation of the solid substance with a solution of the neutral metallocene or the ionizing agent respectively. The neutral metallocene and the ionizing agent may also be used in the pure state.

In the process according to the invention for the preparation of a solid precursor, at least one of the two compounds (the compound based on a neutral metallocene and the compound based on an ionizing agent) is used in the solid state, generally in the state of a powder. In the case where the two compounds are used in the state of powders, these powders preferably have a particle size which is appropriate to keep their mixture homogeneous without a phase separation being produced. To this end, the compound based on an ionizing agent and the compound based on a neutral metallocene preferably have particle sizes of the same order of magnitude, characterized, for example, by a mean diameter B of 1 to 100 μm and a standard deviation of 5 to 25 μm.

In the process according to the invention for the preparation of a solid precursor, it may turn out to be necessary to dry the powders of the compound based on a neutral metallocene and/or of the compound based on an ionizing agent, prior to mixing them, which may, for example, be carried out by treatment with a hydrophilic compound or by heating at a temperature lower than the decomposition temperature of these powders and for a sufficient period of time to remove all trace of moisture from the powders.

The quantities of the compound based on a metallocene and of the compound based on an ionizing agent which are used in the process according to the invention for the preparation of a solid precursor are commonly in a mole ratio of 0.5 to 2; they are preferably equimolar.

In the process according to the invention for the preparation of a solid precursor, mixing of the compound based on a neutral metallocene with the compound based on an ionizing agent may be carried out by any known appropriate means as long as it is carried out in a heterogeneous medium, for example in a mixer fitted with a stirrer, in a rotating bed reactor, or in a stirred or fluidized bed reactor or alternatively in a rotating reactor. In general, in the case where the mixing is carried out in the absence of an organic liquid, it turns out to be desirable to carry out the mixing of the compound based on a neutral metallocene with the compound based on an ionizing agent by grinding them together. This is preferably carried out in a rotating reactor or in a mixer fitted with a stirrer.

The temperature at which this mixing is carried out may be any temperature lower than the decomposition temperature of the neutral metallocene and of the compound based on an ionizing agent. The temperature therefore depends on the nature of these constituents; it is generally at least equal to 0° C., preferably to 20° C., maximum values equal to 100° C. being the most common, and those lower than 60° C., for example 50° C., being the most advantageous. In the case where the heterogenous medium is a suspension comprising an organic liquid, the temperature should be such that at least 80% (preferably at least 90%) of one of the two compounds (the compound based on an ionizing agent and the compound based on a neutral metallocene) is insoluble in the organic liquid. The mixing may be carried out at a constant temperature or at a variable temperature in a continuous or a discontinuous manner.

In the process according to the invention for the preparation of a solid precursor, the period of time for which the mixing is carried out must be sufficient to homogenize the mixture to the maximum. The mixing time will depend on the mixer used. It is generally at least equal to 1 minute, preferably to 5 h; on economic grounds, it is desirable that it does not exceed 100 h, in particular not 50 h. A period of time of approximately 24 h is particularly suitable.

In the variant of the process according to the invention for the preparation of a solid precursor, where the heterogeneous medium is essentially solid, the compound based on a neutral metallocene and the compound based on an ionizing agent are preferably mixed under an inert atmosphere. This may consist of nitrogen, argon, helium or a mixture of two or more of these gases.

The process according to the invention for the preparation of a solid precursor has the particular advantage of producing stable precursors of catalytic systems, contact of the neutral metallocene with the ionizing agent being made in the absence of an organo-aluminium compound, which makes its performance particularly simple. In addition, the catalytic systems obtained with these precursors have an activity of at least 140 (expressed in grams of polymer obtained per hour and per gram of solid precursor used, and divided by the partial pressure of the olefin expressed in bars) in the processes for the polymerization of olefins.

In a first specially preferred embodiment of the process according to the invention for the preparation of a solid precursor, a support and/or a catalytic compound is additionally mixed with the compound based on a neutral metallocene and the compound based on an ionizing agent. These conform to the support and to the catalytic compound described above. In this embodiment, a quantity of support (or of catalytic compound respectively) is advantageously used such that the weight ratio of the support (or of the catalytic compound respectively) to the compound based on a neutral metalloceone is at least equal to 0.05, preferably to 2; it is desirable that it does not exceed 1000, in particular not 100, values in the region of 10 being recommended.

In this embodiment of the process according to the invention for the preparation of a solid precursor, the mixing must be performed at a temperature lower than the decomposition temperature of the support and/or of the catalytic compound.

In a first variant of this embodiment, the compound based on a neutral metallocene, the compound based on an ionizing agent and the support and/or the catalytic compound) are simultaneously mixed under the conditions (equipment, temperature, time and atmosphere) described above.

In a second variant of this embodiment, the mixing is carried out in several consecutive steps, two of the constituents of the solid precursor (compound based on a neutral metallocene, compound based on an ionizing agent, support and/or catalytic compound) being mixed in a first step, the other constituents being added in one or more subsequent steps. In the case where the solid precursor contains three constituents, it may turn out to be advantageous to mix first of all the compound based on a neutral metallocene with the support (or the catalytic compound) and to subsequently add the compound based on an ionizing agent thereto. In this case, the first step is advantageously carried out at a temperature of 10° to 120° C., typically from 20° to 90° C., for example approximately 60° C. The second step is most often carried out at a temperature lower than that of the first step, for example at a temperature of 0° to 60° C., typically from 20° to 50° C.

In a third especially preferred variant of this embodiment, the mixing is carried out in several consecutive steps, the compound based on a neutral metallocene being mixed, in a first step, with the support and/or the catalytic compound in the state of a powder in the absence of a liquid, the solid mixture thus obtained being subsequently, in a second step, impregnated with a solution of the compound based on an ionizing agent. In this second step, at least 80% (preferably at least 90%) of the compound based on a neutral metallocene is insoluble in the suspension solvent. In this preferred variant, the first step is advantageously carried out at a temperature of 10° to 120° C., typically from 40° to 100° C., for example approximately 80° C. The second step is most often carried out at a temperature lower than that of the first step, for example at a temperature of 0° to 60° C. Room temperature is very suitable.

In a second embodiment of the process according to the invention for the preparation of a solid precursor, the compound based on a neutral metallocene comprises, by way of solid substance other than the neutral metallocene and the ionizing agent, a support and/or a solid catalytic compound. These conform to the support and to the catalytic compound described above. In this second embodiment, the compound based on a neutral metallocene may be obtained by impregnation of the support and/or of the catalytic compound with a solution of the neutral metallocene in an organic solvent. The latter is preferably chosen from aromatic hydrocarbons such as toluene.

In a third and particularly valuable embodiment of the process according to the invention for the preparation of a solid precursor, the compound based on an ionizing agent comprises, by way of solid substance other than the ionizing agent and the neutral metallocene, a support and/or a catalytic compound. These conform to the support and to the catalytic compound described above. In this third embodiment, the compound based on an ionizing agent is advantageously obtained by impregnation of the support and/or of the catalytic compound with a solution of the ionizing agent in a hydrocarbon diluent. The latter is preferably chosen from aromatic hydrocarbons such as toluene or from halogenated aliphatic hydrocarbons such as methylene chloride and chloroform.

In a fourth embodiment of the process according to the invention for the preparation of a solid precursor, a neutral metallocene of formula $(C_p)_a(C_{p'})_b MX_x(-R_r-Si-R'R''R''')_z$ is used, which has been prepared by reacting a silane with a compound of formula $(C_p)_a(C_{p'})_b MX_x H_z$ (where the symbols $C_p$, $C_{p'}$, M, X, a, b, x and z have the same meaning as that given above with the exception of z which is other than 0). This reaction preferably takes place in an adequate solvent. Compounds of formula $(C_p)_a(C_{p'})_b MX_x H_z$ which have led to very good results are especially those derived from zirconium, titanium and hafnium, for which $C_p$ and $C_{p'}$ are chosen from cyclopentadienyl, indenyl and fluorenyl radicals. Those derived from zirconium are preferably used. X preferably is represents chlorine. As examples of silanes which may be used in this embodiment there may be mentioned allyldimethylchlorosilane, allylmethyldiethoxysilane, 5-(dicycloheptenyl) trichlorosilane, 2-bromo-3-trimethyl-silyl-1-propene, 3-chloropropyldimethylvinylsilane, 2-(3cyclohexonyl) ethyltrimethoxysilane, diphenylvinylchloro-silane, vinyltriphenoxysilane, vinyltrichlorosilane, 2-(trimethylsilylmethyl)-1,3-butadiene and 3-(trimethylsilyl)cyclopentene. The preferred silanes are the non-chlorinated alkenylsilanes such as allyltriethoxysilane, allyltrimethylsilane, 5-(bicycloheptenyl) triethoxysilane, vinyl(trimethoxy)silane and 2-(3-cyclohexenyl)ethyltrimethoxysilane. Vinyl(trimethoxy)silane is particularly suitable. The solvent for the reaction between the silane and the compound of formula $(C_p)a(C_{p'})_b MX_x H_z$ is advantageously an aromatic hydrocarbon, preferably toluene. The temperature at which this reaction is carried out may vary from room temperature up to the boiling temperature of the solvent used, for example from 20° to 100° C. The preferred temperature is room temperature.

In a fifth embodiment of the process according to the invention for the preparation of a solid precursor, a neutral metallocene of formula $(C_p)a(C_{p'})_b MX_x Z_z$ (where the symbols $C_p$, $C_{p'}$, M, X, a, b, x and z have the same meaning as that given above, z being other than 0 and Z being a hydrocarbon radical) is used, which has been prepared by reacting a compound of formula $(C_p)_a(C_{p'})_b MX_x H_z$, as defined above, with an olefin. This reaction preferably takes place in an adequate solvent. The olefins which may be used in this embodiment advantageously contain up to 20 carbon atoms, preferably up to 12 carbon atoms, and may be chosen from mono-olefins such as ethylene and 3-ethyl-1-butene, non-conjugated diolefins such as 1,5-hexadiene, conjugated diolefins such as 1,3-pentadiene and alicyclic diolefins such as dicyclopentadienyl. Ethylene is the preferred olefin. The solvent for the reaction between the olefin and the compound of formula $(C_p)_a(C_{p'})_b MX_x H_z$ is advantageously an aromatic hydrocarbon, preferably toluene. The temperature at which this reaction is carried out may vary from room temperature up to the boiling temperature of the solvent used, for example from 20° to 100° C. The preferred temperature is room temperature.

The solid precursor according to the invention may be used in polymerization as it is obtained. It may, however, turn out to be desirable to submit it to a grinding before using it in polymerization.

The solid precursor according to the invention finds an application for the polymerization of olefins, in combination with an organometallic compound.

The invention therefore also relates to a catalytic system for the polymerization of olefins, obtained by bringing into contact a solid precursor in accordance with the invention, as defined above, and an organometallic compound derived from a metal chosen from groups IA, IIA, IIB, IIA and IVA of the Periodic Table.

In the catalytic system according to the invention the organometallic compound derived from a metal chosen from groups IA, IIA, IIB, IIIA and IVA of the Periodic Table may, for example, be selected from organometallic compounds of lithium, magnesium, zinc, aluminium or tin. The best results are obtained with organoaluminium compounds comprising at least one aluminium-carbon bond and which may optionally comprise oxygen and/or a halogen. Examples which may be mentioned are trialkylaluminium compounds, halogenated alkylaluminium compounds and alkylaluminium compounds comprising at least one alkoxy group. The organoaluminium compounds advantageously correspond to the general formula AlTT'T" in which the groups T, T' and T" each denote an optionally substituted alkyl, alkenyl, aryl or alkoxy group containing up to 20 carbon atoms. This may for example be trimethyl-, triethyl-, tripropyl-, triisopropyl-, tributyl-, triisobutyl-, trihexyl-, trioctyl- and tridodecylaluminium. Triethylaluminium and triisobutylaluminium are particularly suitable.

Trimethylaluminium is preferred. The latter turns out to perform particularly well because it makes it possible to reduce, or even to eliminate, the phenomenon of crust formation in the polymerization reactor. In general, formation of a crust occurs when highly productive catalytic systems are used and/or when polymerization is carried out in the presence of hydrogen and optionally one or more comonomers in the polymerization reactor.

The use of trimethylaluminium as an organometallic compound in the catalytic system according to the invention has the advantage by comparison with other trialkylaluminium compounds of increasing the catalytic activity while at the same time decreasing the phenomenon of crust formation, even in the presence of hydrogen and/or one or more comonomers. Its effect on the reduction of crust formation is thus all the more unforeseeable.

In the catalytic system according to the invention, the quantity of organometallic compound used may vary within a wide measure. It is in general such that the mole ratio of the organometallic compound to the neutral metallocene is at least equal to 5. In practice, however, there is no value in this ratio exceeding 5000, values lower than 2000 being recommended. Values in the region of 10 to 500 are generally suitable when the catalytic system is intended for the polymerization of olefins.

The catalytic system according to the invention may be used for the homopolymerization and copolymerization of olefins containing up to 20 carbon atoms per molecule. The olefins advantageously contain from 2 to 12 carbon atoms per molecule and are, for example, chosen from ethylene, propylene, 1-butene, 1-pentene, 3-methyl-1-butene, 1-hexene, 3- and 4-methyl-1-pentenes, 1-octene, 3-ethyl-1-butene, 1-heptene, 3,4-dimethyl-1-hexene, 4-butyl-1-octene, 5-ethyl-1-decone and 3,3-dimethyl-1-butene, and vinyl monomers such as styrene. The catalytic systems according to the invention find a particular use in the production of homopolymers of ethylene and of propylene, or of copolymers of ethylene and of propylene with one or more olefinically unsaturated comonomers. The comonomers may be various materials. They may be monoolefins which may contain up to 8 carbon atoms, for example 1-butene, 1-pentene, 3-methyl-1-butene, 1-hexene, 3- and 4-methyl-1-pentenes and 1-octene. One or more diolefins comprising from 4 to 18 carbon atoms may also be copolymerized with the ethylene and propylene. Preferably, the diolefins are chosen from non-conjugated aliphatic diolefins such as 4-vinylcyclo-hexene and 1,5-hexadiene, alicyclic diolefins having an endocyclic bridge such as dicyclopentadiene, methylene-and ethylidenenorbornene, and conjugated aliphatic diolefins such as 1,3-butadiene, isoprene and 1,3-pentadiene.

The catalytic system according to the invention appears to perform particularly well for the manufacture of homopolymers of ethylene or of propylene, and of copolymers of ethylene or of propylene containing at least 90%, preferably at least 95%, by weight of ethylene or of propylene. The preferred comonomers of ethylene are propylene, 1-butene, 1-hexene, 1-octene and 1,5-hexadiene and their mixtures, and those of propylene are ethylene, 1,3-butadiene, 1,5-hexadiene and their mixtures.

The catalytic system according to the invention is characterized by an advantageous catalytic activity.

The present invention therefore also relates to a process for the polymerization of at least one olefin in which a catalytic system conforming to the invention, such as defined above, is used.

According to the invention it is not essential to use an aromatic solvent at the time of the polymerization.

According to a particularly advantageous embodiment of the process for the polymerization according to the invention, the olefin is first of all mixed with the organometallic compound of the catalytic system and the solid precursor of the said catalytic system is subsequently added to the mixture thus obtained. In this advantageous embodiment of the process for the polymerization according to the invention, the organometallic compound is generally used in the form of a solution in a hydrocarbon diluent. This hydrocarbon diluent may be chosen from aliphatic hydrocarbons such as linear alkanes (for example n-butane, n-hexane and n-heptane), branched alkanes (for example isobutane, isopentane, isooctane and 2,2-dimethylpropane) and cycloalkanes (for example cyclopentane and cyclohexane). It is preferred to work in isobutane or hexane.

In this advantageous embodiment of the process for the polymerization according to the invention, as soon as the solid precursor is placed in contact with the hydrocarbon diluent, the neutral metallocene, the ionizing agent and the organoaluminium compound react so as to convert the neutral metallocene into an active catalytic substance in the ionized state.

This embodiment of the process for the polymerization according to the invention has the advantage of not involving the presence of an aromatic solvent in the polymerization reactor.

In a variant of this particular embodiment of the process for the polymerization according to the invention, which aims to copolymerize at least two olefins, the two olefins are introduced simultaneously or one after the other into the polymerization reactor before addition of the solid precursor of the catalytic system.

In the process for the polymerization according to the invention, the polymerization may either be carried out in solution, in suspension or in the gas phase, and may be carried out continuously or discontinuously, for example by carrying out a polymerization in suspension in a first reactor followed by a polymerization in the gas phase in a second reactor or by working in the gas phase in two consecutive reactors. As a variant, the polymerization may also be carried out in several reactors arranged in series, the temperature and/or the pressure in the first reactor being different from those prevailing in the other reactors. In the polymerization it is optionally possible to use a molecular weight regulator such as hydrogen and diethylzinc.

In the case of a polymerization in suspension, the latter is carried out in a hydrocarbon diluent at a temperature such that at least 80% (preferably at least 95%) of the (co) polymer formed is soluble therein. The hydrocarbon diluent may be chosen from liquid aliphatic, cycloaliphatic and aromatic hydrocarbons. The preferred diluents are linear alkanes such as n-butane, n-hexane and n-heptane, or branched alkanes such as isobutane, isopentane, isooctane and 2,2-dimethylpropane, or cycloalkanes such as cyclopentane and cyclohexane or their mixtures. The temperature is generally at least equal to 20° C., preferably at least 50° C.; it is commonly at the most equal to 200° C., preferably at the most 100° C. The olefin partial pressure is most often at least equal to atmospheric pressure, preferably $\geq 0.4$ MPa, for example $\geq 0.6$ MPa; this pressure is in general at the most equal to 5 MPa, preferably $\leq 2$ MPa, for example $\leq 1.5$ MPa.

In the case of a polymerization in solution, the latter may be carried out in a hydrocarbon diluent such as those mentioned above. The operating temperature depends on the hydrocarbon diluent used and must be greater than the temperature of dissolution of the polymer in the latter, such that at least 80% (preferably at least 95%) of the polymer is dissolved therein. Furthermore, the temperature must be sufficiently low to prevent a thermal degradation of the polymer and/or of the catalytic system. In general, the optimum temperature is from 100° to 200° C. The olefin partial pressure is most often at least equal to atmospheric pressure, preferably $\geq 0.4$ MPa, for example $\geq 0.6$ MPa; this pressure is in general at the most equal to 5 MPa, preferably $\leq 2$ MPa, for example $\leq 1.5$ MPa. As a variant, the polymerization is carried out by using the olefin itself as hydrocarbon diluent. In this variant a liquid olefin may be used under normal pressure and temperature conditions, or it is possible to work at a sufficient pressure that an olefin which is normally gaseous is liquefied.

In the case where the polymerization is carried out in the gas phase, it may be performed in a fluidized bed. To this end, a stream of gas comprising the olefin is used and it is placed in contact with the catalytic system in the fluidized bed. The flow rate of the gas stream must therefore be sufficient to maintain the polymer in fluidization, and depends on the rate of formation of the latter and the rate at which the catalytic system is consumed. The olefin partial pressure may be lower than or greater than atmospheric pressure, the preferred partial pressure varying from atmospheric pressure to approximately 7 MPa. In general, a pressure of 0.2 to 5 MPa is suitable. The choice of temperature is not critical, and it is generally from 30° to 200° C. A dilution gas may optionally be used, which must be inert towards the polymer.

The process for the polymerization according to the invention performs particularly well for the manufacture of homopolymers of ethylene and propylene, and of copolymers of ethylene and/or propylene.

The examples described below serve to illustrate the invention. In these examples a solid precursor in accordance with the invention was manufactured, by means of the process according to the invention, and was subsequently used for polymerizing ethylene.

The meanings of the symbols used in these examples, the units expressing the parameters mentioned and the methods of measurement of these parameters are explained below.

HLMI=high-load melt flow index for the polymer at 190° C., measured under a load of 21.6 kg and expressed in g/10 min following the standard ASTM D 1238.

$\alpha$=catalytic activity expressed in grams of polymer obtained per hour and per gram of solid precursor used, and divided by the partial pressure of the olefin expressed in bars.

ASW=Apparent specific weight of the polymer expressed in g/dm$^3$ and measured by free flow according to the following operating procedure: into a cylindrical container of 50 cm$^3$ capacity is poured the polymer powder to be analysed, taking care not to compact it, from a hopper the lower edge of which is positioned 20 mm above the upper edge of the container. The container filled with the powder is subsequently weighed, the tare of the weight empty is deducted and the result obtained (expressed in g) is divided by 50.

$M_z$=mean molecular mass of the polymer defined by the relationship $$M_z = \frac{\Sigma w_i M_i^2}{\Sigma w_i M_i}$$

where $w_i$ denotes the weight of the polymer of molecular mass $M_i$. The parameter $M_z$ is measured by steric exclusion chromatography carried out in 1,2,4-trichlorobenzene at 135° C. on a 150 C type chromatograph from the company WATERS.

OF=Oligomer fraction of the polymer expressed in grams of oligomers per kilo of polymer and measured by extraction for 2 h in hexane at its boiling temperature.

<M>=transition metal M content of the polymer expressed in ppm by weight and measured by X-ray diffraction.

SMD=standard mass density of the polymer expressed in kg/m$^3$ and measured according to standard ASTM D 1928.

SS=Specific surface of the solid precursor expressed in m$^2$/g and measured according to the British standard BS 4359/1.

PV=Pore volume of the solid precursor measured by the method of nitrogen penetration by means of porosity meters marketed by CARLO ERBA CO and expressed in cm$^3$/g.

$M_w/M_n$=ratio between the weight average molecular mass ($M_w$) and the number average molecular mass ($M_n$) measured by steric exclusion chromatography carried out in 1,2,4-trichlorobenzene at 135° C. on a 150 C type chromatograph from the company WATERS.

EXAMPLE 1

(in accordance with the invention)

In this example a solid precursor consisting of a neutral halogenated metallocene, an ionizing agent and an inorganic support was manufactured. It was subsequently used for the manufacture of an ethylene homopolymer.

A. Preparation of the Solid Precursor (a) Preparation of the Support

The support was prepared by mixing a silica powder (having a mean diameter D of 112 μm and a standard deviation σ of 33 μm), preactivated for 16 hours at 600° C. under dry air, with magnesium dichloride powder in quantities such that their mixture contains 9.8% by weight of magnesium. This mixture was heated in a rotating oven for 16 hours at 400° under a nitrogen flush.

(b) Preparation of the Support-Neutral Haloaenated Metallocene Binary Mixture

A mixture of 3.9 g of the support obtained in (a) with 389 mg of dicyclopentadienyldichlorozirconium powder was prepared in a rotating mixer which was left to rotate for 10 hours, at 50° C. under nitrogen. The mixing was continued in a container fitted with a magnetic stirrer for a further 5 hours at 85° C. under nitrogen.

(c) Preparation of the Support-Metallocene-Ionizing Agent Ternary Mixture 1.2 g of the powder obtained in (b) were mixed with 366 mg of triphenylcarbenium tetrakispentafluoro-phenylborate powder in a container fitted with a magnetic stirrer for 20 hours at room temperature under nitrogen. The precursor thus obtained comprised (% by weight):

Cl:14.3

Zr:1.7

Mg:4.7 and had a specific surface SS of 167 and a pore volume PV of 1.07.

B. Polymerization of Ethylene

Into an autoclave of capacity 3 litres fitted with a stirrer were introduced 1 l of isobutane and 1 mmol of triethylaluminium. The temperature was brought to 50° C. Ethylene was subsequently introduced up to a pressure of 1 MPa. The temperature and the ethylene pressure were maintained constant for the duration of the polymerization. 100 mg of the solid precursor obtained in A were then introduced. After 30 minutes the autoclave was degassed and cooled. 123 g of polyethylene were recovered, having the following characteristics:

HLMI=0.12

ASW=124

SMD=939.9

OF =0.8

<Zr>=16.5

$M_z$=2,313,000

$M_w/M_n$=7.4

The catalytic system had an activity $\alpha$ of 246.

EXAMPLE 2

(in accordance with the invention)

In this example a solid precursor consisting of a neutral metallocene, an ionizing agent, an inorganic support and a catalytic compound was manufactured. It was subsequently used for the manufacture of an ethylene homopolymer.

A. Preparation of the Solid Precursor
(a) Preparation of the Catalytic Compound

Magnesium diethylate was reacted with titanium tetrabutylate in quantities such that the mole ratio of magnesium to titanium was equal to 2. The reaction product thus obtained was subsequently chlorinated by placing it in contact with a solution of ethylaluminium dichloride. A solid compound was recovered which comprised (% by weight):

Ti:17.0

Cl:36.2

Al :1.9

Mg :4.5

(b) Preparation of the Metallocene-Support-Catalytic Compound Ternary Mixture 511 mg of the catalytic compound obtained in (a) was mixed with 3 g of the product obtained in Example 1 A (b) in a container fitted with a stirrer, for 12 hours at 60° C. under nitrogen.

(c) Preparation of the Metallocene-Support-Catalytic Compound-Ionizing Agent Quaternary Mixture A mixture of 3 g of a powder of the ternary mixture obtained in (b) with 807 mg of triphenylcarbenium tetrakis (pentafluorophenyl)borate powder was prepared, and the product thus obtained was maintained stirred for 48 hours at room temperature under nitrogen. The solid precursor thus obtained comprised (% by weight):

Cl:13.0

Zr:1.8

Ti:2.4

Al:0.3

Mg:5.1 and had a specific surface SS of 92 and a pore volume of 0.55.

B. Polymerization of Ethylene

Into an autoclave of capacity 3 litres fitted with a stirrer were introduced 1 l of isobutane and 1 mmol of triethylaluminium. The temperature was brought to 50° C. Ethylene was subsequently introduced up to a pressure of 1 MPa. The temperature and the ethylene pressure were kept constant for the duration of the polymerization. 101 mg of the solid precursor obtained in A were then introduced. After 30 minutes the autoclave was degassed and cooled. 142 g of polymer were recovered, having the following characteristics:

HLMI=0.04

ASW=162

SMD=938

OF=0.8

<Zr>=10.5

<Ti>=15.6

$M_z$=14,955,000

$M_w/M_n$=18.2

The catalytic system had an activity $\alpha$ of 282.

EXAMPLE 3

(in accordance with the invention)

In this example a solid precursor consisting of a neutral halogenated metallocene, an ionizing agent and a catalytic compound was manufactured. It was subsequently used for the manufacture of an ethylene copolymer.

A. Preparation of the Solid Precursor
(a) Preparation of the Metallocene-Catalytic Compound Binary Mixture 1.2 g of a powder of the compound obtained in Example 2 A (a) were mixed with 590 mg of dicyclopentadienyldichlorozirconium powder in a container fitted with a stirrer for 4 hours at 85° C. under nitrogen.

(b) Preparation of the Metallocene-Catalytic Compound-Ionizing Agent Ternary Mixture Triphenylcarbenium tetrakis(pentafluoro-phenyl)borate powder was added to the powder obtained in (a) in quantities such that the mole ratio of the neutral metallocene and the ionizing agent was equal to 1. These two powders were mixed in a container fitted with a stirrer for 16 hours at room temperature under nitrogen.

The solid precursor thus obtained comprised (% by weight):

Cl:13.7

Zr:4.9

Ti:5.7.

B. Copolymerization of Ethylene With Butene

Into an autoclave of capacity 3 litres fitted with a stirrer were introduced 1 l of isobutane and 1 mmol of triethylaluminium. The temperature was raised to 50° C. Ethylene up to a pressure of 1 MPa and 3 g of liquid butene were subsequently introduced. The temperature and the ethylene pressure were kept constant for the duration of the polymerization. 49 mg of the solid precursor obtained in A were then introduced. After 60 minutes the autoclave was degassed and cooled. 309 g of polymer were recovered, having the following characteristics:

HLMI=0.11
ASW=243
SMD=931.5
OF=0.5
$<Zr>$=5
$M_z$=1,700,000
$M_w/M_n$=32.0.

The catalytic system had an activity $\alpha$ of 631.

EXAMPLE 4

(in accordance with the invention)

In this example the solid precursor of Example 3 was used for the manufacture of an ethylene homopolymer.

Polymerization of Ethylene

Into an autoclave of capacity 3 litres fitted with a stirrer were introduced 1 l of isobutane and 1 mmol of triethylaluminium. The temperature was raised to 50° C. Ethylene was subsequently introduced up to a pressure of 1 MPa. The temperature and the ethylene pressure were kept constant for the duration of the polymerization. 57 mg of the solid precursor of Example 3 were then introduced. After 60 minutes the autoclave was degassed and cooled. 324 g of polyethylene were recovered having the following characteristics: p1 HLMI<0.1

SMD=938
OF=0.2
$M_z$=3,783,000
$M_w/M_n$=60.

The catalytic system had an activity $\alpha$ of 568.

EXAMPLE 5

(in accordance with the invention)

In this example a solid precursor consisting of a neutral halogenated metallocene, an ionizing agent and an inorganic support was manufactured. It was subsequently used for the manufacture of an ethylene copolymer.

A. Preparation of the Solid Precursor
(a) Preparation of the Support-Metallocene Binary Mixture A mixture of 1.2 g of the support obtained in Example 1 A (a) with 143.3 mg of dicyclopentadienyldichlorozirconium powder was prepared in a container fitted with a stirrer which was left stirring for 4 hours at room temperature under nitrogen.
(b) Preparation of the Support-Metallocene-Ionizing Agent Ternary Mixture 465.2 mg of triphenylcarbenium tetrakis (pentafluorophenyl)borate powder were added to the powder obtained in (a) and these two powders were mixed in a container fitted with a stirrer for 16 hours at room temperature under nitrogen. The solid precursor thus obtained comprised (% by weight):

Cl:10.4

Zr:2.4 and had a specific surface SS of 170 and a pore volume PV of 1.12.

B. Polymerization of Ethylene

Into an autoclave of capacity 3 litres fitted with a stirrer were introduced 1 l of isobutane and 1 mmol of triethylaluminium. The temperature was brought to 50° C. Ethylene was subsequently introduced up to a pressure of 1 MPa. The temperature and the ethylene pressure were kept constant for the duration of the polymerization. 80 mg of the solid obtained in A were then introduced. After 60 minutes the autoclave was degassed and cooled. 192 g of polymer were recovered having the following characteristics:

HLMI=0.1
ASW=144
SMD=940.0
OF=0.7
$<Zr>$=8.5
$M_z$=1,216,000
$M_w/M_n$=4.7.

The catalytic system had an activity $\alpha$ of 147.

EXAMPLE 6

(in accordance with the invention)

In this example a solid precursor consisting of a neutral halogenated metallocene, an ionizing agent and an inorganic support was manufactured. It was then used for the manufacture of an ethylene homopolymer.

A. Preparation of the solid precursor
(a) Preparation of the Support

The operations of Example 1 A (a) were repeated.
(b) Preparation of the Support-Ionizing Agent Binary Mixture 3.8 g of the support obtained in (a) was impregnated with a solution containing 1.4191 g of triphenylcarbenium tetrakis(pentafluorophenyl)borate in 40 ml of toluene at a maximum temperature of 45° C. The toluene was subsequently removed by distillation under reduced pressure until a powder was obtained.
(c) Preparation of the Support-Ionizing Agent-Neutral Halogenated Metallocene Ternary Mixture The powder obtained in (b) was mixed with 482.8 mg of dicyclopentadienyldichlorozirconium powder, which had been ground beforehand in a rotating mixer at room temperature for 70 h. The solid mixture thus obtained was subsequently ground at room temperature for 4 h in a container fitted with a magnetic stirrer.

B. Polymerization of Ethylene

In an autoclave of capacity three litres fitted with a stirrer were introduced 1 l of isobutane and 1 mmol of triethylaluminium. The temperature was brought to 50° C. Ethylene was subsequently introduced up to a pressure of 1 MPa. The temperature and the ethylene pressure were kept constant for the duration of the polymerization. 83 mg of the solid precursor obtained in A were then introduced. After 60 minutes the autoclave was degassed and cooled. 130 g of polyethylene were recovered, having the following characteristic:

ASW=243.

The catalytic system had an activity $\alpha$ of 156.

EXAMPLE 7

(in accordance with the invention)

In this example the solid precursor of Example 6 was used after storage for 6 days at room temperature and under a nitrogen atmosphere, for the manufacture of an ethylene homopolymer.

19

Polymerization of Ethylene

Into an autoclave of capacity 3 litres fitted with a stirrer were introduced 1 l of isobutane and 1 mmol of triethylaluminium. The temperature was brought to 50° C. Ethylene was subsequently introduced up to a pressure of 1 MPa. The temperature and the ethylene pressure were kept constant for the duration of the polymerization. 84 mg of the solid precursor of Example 6, which had been stored for 6 days at room temperature and under nitrogen atmosphere after its preparation, were then introduced. After 64 minutes, the autoclave was degassed and cooled. 167 g of polyethylene were recovered. The catalytic system had an activity a of 186.

The results of Examples 6 and 7 demonstrate the stability of the precursor according to the invention.

EXAMPLE 8

(in accordance with the invention)

In this example a solid precursor consisting of a neutral halogenated metallocene, an ionizing agent and an inorganic support was manufactured. It was subsequently used for the manufacture of an ethylene homopolymer.

A. Preparation of the Solid Precursor
(a) Preparation of the Support 9.8 g of silica powder (having a mean diameter D of 112 μm and a standard deviation α of 33 μm), preactivated for 6 hours at 600° C. under nitrogen, were mixed in a rotating oven with 1.2 g of anhydrous magnesium dichloride powder for 16 hours at 400° C. under a nitrogen atmosphere.
(b) Preparation of the Support-Neutral Halogenated Metallocene Binary Mixture A mixture of 2.6 g of the support obtained in (a) with 306.2 mg of dicyclopentadienyldichlorozirconium powder and 40 ml of toluene was prepared in a rotating mixer. The toluene was subsequently removed by distillation under reduced pressure at a temperature varying from 70° to 80° C. for 2 hours. The mixer was then left stirring for a further 5 hours at a temperature varying from 70° to 80° C., which was continued for 66 hours at room temperature and for 3 hours at a temperature varying from 70° to 80° C., the mixture being kept under a nitrogen atmosphere.
(c) Preparation of the Support-Metallocene-Ionizing Agent Ternary Mixture The solid obtained in (b) was impregnated with a solution of 966 mg of triphenylcarbenium tetrakis-(pentafluorophenyl)borate in 60 ml of toluene at room temperature. The toluene was subsequently removed by distillation under reduced pressure at 30° C., and a solid precursor was collected which was stirred in a rotating mixer for 17 hours at room temperature.

B. Polymerization of Ethylene

Into an autoclave of capacity 3 litres fitted with a stirrer were introduced 1 l of isobutane and 1 mmol of triethylaluminium. The temperature was brought to 50° C. Ethylene was subsequently introduced up to a pressure of 1 MPa. The temperature and the ethylene pressure were kept constant for the duration of the polymerization. 78 mg of the solid precursor obtained in A were then introduced. After 120 minutes the autoclave was degassed and cooled. 213 g of polyethylene were recovered, having the following characteristic:

ASW=281.

The catalytic system had an activity α of 137.

20

Example 9, described below, is an example for comparison. It serves to show the importance of incorporating the ionizing agent with the solid precursor of the catalytic system before the polymerization.

EXAMPLE 9

(given by way of comparison)

A. Preparation of a Solid Catalyst Precursor

Operations A(a) and (b) of Example 1 were repeated, with the exception of the operation (c).

B. Polymerization of Ethylene

Into an autoclave of capacity 3 litres fitted with a stirrer were introduced 1 l of isobutane and 1 mmol of triethylaluminium. The temperature was brought to 70° C. Ethylene was subsequently introduced up to a pressure of 0.6 MPa. 87 mg of the solid precursor obtained in A were then introduced. The temperature and the ethylene pressure were kept constant for 10 minutes. The temperature was subsequently decreased to 50° C. and the ethylene partial pressure increased to 1 MPa. 0.002 mmol of triphenylcarbenium tetrakis(pentafluoro-phenyl)borate (ionizing agent) was then injected. The temperature and the ethylene partial pressure were then kept constant at these new values for a further 30 minutes. Afterwards, the autoclave was degassed and cooled. 114 g of polymer were recovered, having the following characteristics:

HLMI=0.07

ASW=82

SMD=938.3

OF=0.8

$\langle Zr \rangle$=13.5

$M_z$=1,199.000

$M_w/M_n$=4.6.

A comparison of the results of Example 9 with those of Example 1 reveals the progress brought about by the invention insofar as the average molecular mass and the apparent specific weight of the polymer are concerned.

EXAMPLE 10

(in accordance with the invention)

In this example a solid precursor consisting of a neutral halogenated metallocene, an ionizing agent and an inorganic support was manufactured. It was subsequently used for the manufacture of an ethylene homopolymer.

A. Preparation of the Solid Precursor
(a) Preparation of the Support 9.8 g of silica powder (having a mean diameter D of 112 μm and a standard deviation α of 33 μm), preactive for 6 hours at 600° C. under nitrogen, were mixed in a rotating oven with 1.2 g of anhydrous magnesium dichloride powder for 16 hours at 400° C. under a nitrogen atmosphere.
(b) Preparation of the Support-Neutral Halogenated Metallocene Binary Mixture A mixture of 2.0 g of the support obtained in (a) with 239.7 mg of dicyclopentadionyldichlorozirconium powder and 20 ml of toluene was prepared in a rotating mixer. The toluene was subsequently removed by distillation under reduced pressure at a temperature of 70° C. for 45 minutes. The mixer was then left stirring for a further 10 minutes at a temperature of 70° C. A solid was collected and step (c) described below was immediately carried out.

(c) Preparation of the Support-Metallocene-Ionizing Agent Ternary Mixture

The solid obtained in (b) was impregnated with a solution of 750 mg of triphenylcarbenium tetrakis (pentafluorophenyl)borate in 20 ml of toluene at room temperature. The toluene was subsequently removed by distillation under reduced pressure at room temperature, and a solid precursor was collected.

B. Polymerization of Ethylene

Into an autoclave of capacity 3 litres fitted with a stirrer were introduced 1 mmol of trimethylaluminium and 1 l of isobutane. The temperature was brought to 50° C. Hydrogen was subsequently introduced to a partial pressure of 0.17 MPa followed by ethylene up to a pressure of 1 MPa. The temperature and the ethylene and hydrogen pressures were kept constant for the duration of the polymerization. 66 mg of the solid precursor obtained in A were then introduced. After 60 minutes the autoclave was degassed and cooled. 197 g of polyethylene were collected. No trace of crust formation on the interior of the polymerization reactor was observed. The catalytic system had an activity α of 299.

What is claimed is:

1. A process for the preparation of a solid precursor of a catalytic system for the polymerization of olefins which contains (a) at least one halogenated neutral metallocene derived from a transition metal wherein said transition metal is linked to at least one halogen atom, (b) at least one ionizing agent selected from the group consisting of (b1) ionic compounds comprising a cation having Lewis acid properties and which ionizes the neutral metallocene and an anion which is inert towards an ionized metallocene and which stabilizes the said ionized metallocene, and (b2) nonionic compounds having Lewis acid properties and converts the neutral metallocene into a cationic metallocene and (c) at least one solid substance selected from the group consisting of (c1) inorganic supports and (c2) polymeric supports and (c3) catalytic compounds for the polymerization of olefins selected from the group consisting of (i) halides and oxyhalides of a transition metal selected from the group consisting of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, the process comprising:

(a) mixing, in a first step, the halogenated neutral metallocene with the solid substance in the state of a powder in the absence of a liquid, (b) impregnating, in a second step, the solid mixture thus obtained with a solution of the ionizing agent, at least 80% of the neutral metallocene being insoluble in said solution.

2. The process according to claim 1, wherein the neutral metallocene is of formula $(C_p)_a(C_{p'})_bMX_xZ_z$, in which $C_p$ and $C_{p'}$ each denote an unsaturated hydrocarbon radical coordinated to the central atom M, it being possible for the groups $C_p$ and $C_{p'}$ to be linked by a covalent bridge, M denotes the transition metal, which is chosen from groups IIIB, IVB, VB and VIB of the Periodic Table, a, b, x and z denotes integers such that $(a+b+x+z)=m$, $x>0$, $z \geq 0$ and a and/or $b \neq 0$, m denotes the valency of the transition metal M, X denotes a halogen, and Z denotes a hydrocarbon radical which may optionally contain oxygen or a silyl radical of formula ($-R_t-$Si$-$R'R"R"') in which R denotes an optionally substituted alkyl, alkenyl, aryl, alkoxy or cycloalkyl group containing up to 20 carbon atoms, R', R" and R"' are identical or different and each denote a halogen or an optionally substituted alkyl, alkenyl, aryl, alkoxy or cycloalkyl group containing up to 20 carbon atoms, t denotes 0 or 1.

3. The process according to claim 1, wherein the ionizing agent is chosen from triphenylcarbenium tetrakis (pentafluorophenyl)borate and tri(pentafluorophenyl)boron.

4. The process according to claim 1, wherein the solid precursor has a stability greater than 0.95, defined by the ratio between, on the one hand, the weight of polyethylene obtained on polymerizing, for one hour, ethylene at a partial pressure of 1 bar in the presence of a catalytic system incorporating, in a weight ratio of 0.1 to 10, an organometallic compound and the said precursor which has undergone, after mixing of the neutral halogenated metallocene and the ionizing agent, storage for 48 hours at room temperature under nitrogen atmosphere and, on the other hand, the weight of polyethylene obtained on polymerizing, for one hour, ethylene at a partial pressure of 1 bar in the presence of the same catalytic system, in which the precursor has not undergone storage.

5. The process according to claim 1, wherein the catalytic compound comprises 10 to 30% by weight of a transition metal chosen from Groups IIIB, IVB, VB and VIB of the Periodic Table, 20 to 50% by weight of a halogen, 0.5 to 20% by weight of magnesium and 0.5 to 20% by weight of aluminium.

6. A process for the preparation of a solid precursor of a catalytic system for the polymerization of olefins which contains (a) at least one halogenated neutral metallocene derived from a transition metal wherein said transition metal is linked to at least one halogen atom, (b) at least one ionizing agent selected from the group consisting of (b1) ionic compounds comprising a cation having Lewis acid properties and which ionizes the neutral metallocene and an anion which is inert towards an ionized metallocene and which stabilizes the said ionized metallocene, and (b2) nonionic compounds having Lewis acid properties and converts the neutral metallocene into a cationic metallocene and (c) at least one solid substance selected from the group consisting of (c1) inorganic supports and (c2) polymeric supports and (c3) catalytic compounds for the polymerization of olefins selected from the group consisting of (i) halides and oxyhalides of a transition metal selected from the group consisting of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, the process comprising:

(a) impregnating, in a first step, the solid substance with a solution of the halogenated neutral metallocene in an organic solvent, (b) mixing, in a second step, the impregnated solid substance thus obtained with the ionizing agent in a heterogeneous medium wherein at least 80% of the halogenated neutral metallocene and/or the ionizing agent is insoluble in said heterogeneous medium.

7. The process according to claim 6, wherein the neutral metallocene is of formula $(C_p)_a(C_{p'})_bMX_xZ_z$, in which $C_p$ and $C_{p'}$ each denote an unsaturated hydrocarbon radical coordinated to the central atom M, it being possible for the groups $C_p$ and $C_{p'}$ to be linked by a covalent bridge, M denotes the transition metal, which is chosen from groups IIIB, IVB, VB and VIB of the Periodic Table, a, b, x and z denotes integers such that (a+b+x+z)=m, x>0, z≧0 and a and/or b≠0, m denotes the valency of the transition metal M, X denotes a halogen, and Z denotes a hydrocarbon radical which may optionally contain oxygen or a silyl radical of formula (—R$_t$—Si—R'R"R"') in which R denotes an optionally substituted alkyl, alkenyl, aryl, alkoxy or cycloalkyl group containing up to 20 carbon atoms, R', R" R"' are identical or different and each denote a halogen or an optionally substituted alkyl, alkenyl, aryl, alkoxy or cycloalkyl group containing up to 20 carbon atoms, t denotes 0 or 1.

8. The process according to claim 6, wherein the ionizing agent is chosen from triphenylcarbenium tetrakis (pentafluorophenyl)borate and tri(pentafluorophenyl)boron.

9. The process according to claim 6, wherein the solid precursor has a stability greater than 0.95, defined by the ratio between, on the one hand, the weight of polyethylene obtained on polymerizing, for one hour, ethylene at a partial pressure of 1 bar in the presence of a catalytic system incorporating, in a weight ratio of 0.1 to 10, an organometallic compound and the said precursor which has undergone, after mixing of the neutral halogenated metallocene and the ionizing agent, storage for 48 hours at room temperature under nitrogen atmosphere and, on the other hand, the weight of polyethylene obtained on polymerizing, for one hour, ethylene at a partial pressure of 1 bar in the presence of the same catalytic system, in which the precursor has not undergone storage.

10. The process according to claim 6, wherein the catalytic compound comprises 10 to 30% by weight of a transition metal chosen from Groups IIIB, IVB, VB and VIB of the Periodic Table, 20 to 50% by weight of a halogen, 0.5 to 20% by weight of magnesium and 0.5 to 20% by weight of aluminium.

11. A process for the preparation of a solid precursor of a catalytic system for the polymerization of olefins which contains (a) at least one halogenated neutral metallocene derived from a transition metal wherein said transition metal is linked to at least one halogen atom, (b) at least one ionizing agent selected from the group consisting of (b1) ionic compounds comprising a cation having Lewis acid properties and which ionizes the neutral metallocene and an anion which is inert towards an ionized metallocene and which stabilizes the said ionized metallocene, and (b2) nonionic compounds having Lewis acid properties and converts the neutral metallocene into a cationic metallocene and (c) at least one solid substance selected from the group consisting of (c1) inorganic supports and (c2) polymeric supports and (c3) catalytic compounds for the polymerization of olefins selected from the group consisting of (i) halides and oxyhalides of a transition metal selected from the group consisting of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, the process comprising:

(a) impregnating, in a first step, the solid substance with a solution of the ionizing agent in a hydrocarbon diluent, (b) mixing, in a second step, the thus obtained impregnated solid substance with the halogenated neutral metallocene in a heterogeneous medium wherein at least 80% of the halogenated neutral metallocene and/or the ionizing agent is insoluble in said heterogenous medium.

12. The process according to claim 11, wherein the neutral metallocene is of formula $(C_p)_a(C_{p'})_b MX_x Z_z$, in which $C_p$ and $C_{p'}$ each denote an unsaturated hydrocarbon radical coordinated to the central atom M, it being possible for the groups $C_p$ and $C_{p'}$ to be linked by a covalent bridge, M denotes the transition metal, which is chosen from groups IIIB, IVB, VB and VIB of the Periodic Table, a, b, x and z denotes integers such that (a+b+x+z)=m, x>0, z≧0 and a and/or b≠0, m denotes the valency of the transition metal M, X denotes a halogen, and Z denotes a hydrocarbon radical which may optionally contain oxygen or a silyl radical of formula (—R$_t$—Si—R'R"R"') in which R denotes an optionally substituted alkyl, alkenyl, aryl, alkoxy or cycloalkyl group containing up to 20 carbon atoms, R', R" and R"' are identical or different and each denote a halogen or an optionally substituted alkyl, alkenyl, aryl, alkoxy or cycloalkyl group containing up to 20 carbon atoms, t denotes 0 or 1.

13. The process according to claim 11, wherein the ionizing agent is chosen from triphenylcarbenium tetrakis (pentafluorophenyl)borate and tri(pentafluorophenyl)boron.

14. The process according to claim 11, wherein the solid precursor has a stability greater than 0.95, defined by the ratio between, on the one hand, the weight of polyethylene obtained on polymerizing, for one hour, ethylene at a partial pressure of 1 bar in the presence of a catalytic system incorporating, in a weight ratio of 0.1 to 10, an organometallic compound and the said precursor which has undergone, after mixing of the neutral halogenated metallocene and the ionizing agent, storage for 48 hours at room temperature under nitrogen atmosphere and, on the other hand, the weight of polyethylene obtained on polymerizing, for one hour, ethylene at a partial pressure of 1 bar in the presence of the same catalytic system, in which the precursor has not undergone storage.

15. The process according to claim 11, wherein the catalytic compound comprises 10 to 30% by weight of a transition metal chosen from Groups IIIB, IVB, VB and VIB of the Periodic Table, 20 to 50% by weight of a halogen, 0.5 to 20% by weight of magnesium and 0.5 to 20% by weight of aluminium.

16. A process for the preparation of a solid precursor of a catalytic system for the polymerization of olefins which contains (a) at least one halogenated neutral metallocene derived from a transition metal wherein said transition metal is linked to at least one halogen atom, (b) at least one ionizing agent selected from the group consisting of (b1) ionic compounds comprising a cation having Lewis acid properties and which ionizes the neutral metallocene and an anion which is inert towards an ionized metallocene and which stabilizes the said ionized metallocene, and (b2) nonionic compounds having Lewis acid properties and converts the neutral metallocene into a cationic metallocene and (c) at least one solid substance selected from the group consisting of (c1) inorganic supports and (c2) polymeric supports and (c3) catalytic compounds for the polymerization of olefins selected from the group consisting of (i) halides and oxyhalides of a transition metal selected from the group consisting of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, the process comprising:

(a) in a first step, mechanically mixing, in the solid state, the ionizing agent with the solid substance, (b) mixing, in a second step, the thus obtained impregnated solid substance with the halogenated neutral metallocene in a heterogeneous medium wherein at least 80% of the halogenated neutral metallocene and/ or the ionizing agent is insoluble in said heterogeneous medium.

17. The process according to claim 16, wherein the neutral metallocene is of formula $(C_p)_a(C_{p'})_bMX_xZ_z$, in which $C_p$ and $C_{p'}$ each denote an unsaturated hydrocarbon radical coordinated to the central atom M, it being possible for the groups $C_p$ and $C_{p'}$ to be linked by a covalent bridge, M denotes the transition metal, which is chosen from groups IIIB, IVB, VB and VIB of the Periodic Table, a, b, x and z denotes integers such that $(a+b+x+z)=m$, $x>0$, $z \geq 0$ and a and/or $b \neq 0$, m denotes the valency of the transition metal M, X denotes a halogen, and Z denotes a hydrocarbon radical which may optionally contain oxygen or a silyl radical of formula (—R$_t$—Si—R'R"R'") in which R denotes an optionally substituted alkyl, alkenyl, aryl, alkoxy or cycloalkyl group containing up to 20 carbon atoms, R', R" and R'" are identical or different and each denote a halogen or an optionally substituted alkyl, alkenyl, aryl, alkoxy or cycloalkyl group containing up to 20 carbon atoms, t denotes 0 or 1.

18. The process according to claim 16, wherein the ionizing agent is chosen from triphenylcarbenium tetrakis (pentafluorophenyl)borate and tri(pentafluorophenyl)boron.

19. The process according to claim 16, wherein the solid precursor has a stability greater than 0.95, defined by the ratio between, on the one hand, the weight of polyethylene obtained on polymerizing, for one hour, ethylene at a partial pressure of 1 bar in the presence of a catalytic system incorporating, in a weight ratio of 0.1 to 10, an organometallic compound and the said precursor which has undergone, after mixing of the neutral halogenated metallocene and the ionizing agent, storage for 48 hours at room temperature under nitrogen atmosphere and, on the other hand, the weight of polyethylene obtained on polymerizing, for one hour, ethylene at a partial pressure of 1 bar in the presence of the same catalytic system, in which the precursor has not undergone storage.

20. The process according to claim 16, wherein the catalytic compound comprises 10 to 30% by weight of a transition metal chosen from Groups IIIB, IVB, VB and VIB of the Periodic Table, 20 to 50% by weight of a halogen, 0.5 to 20% by weight of magnesium and 0.5 to 20% by weight of aluminium.

21. A process for the preparation of a solid precursor of a catalytic system for the polymerization of olefins which contains (a) at least one halogenated neutral metallocene derived from a transition metal wherein said transition metal is linked to at least one halogen atom, (b) at least one ionizing agent selected from the group consisting of (b1) ionic compounds comprising a cation having Lewis acid properties and which ionizes the neutral metallocene and an anion which is inert towards an ionized metallocene and which stabilizes the said ionized metallocene, and (b2) nonionic compounds having Lewis acid properties and converts the neutral metallocene into a cationic metallocene and (c) at least one solid substance selected from the group consisting of (c1) inorganic supports and (c2) polymeric supports and (c3) catalytic compounds for the polymerization of olefins selected from the group consisting of (i) halides and oxyhalides of a transition metal selected from the group consisting of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, the process comprising:

(a) in a first step, mechanically mixing, in the solid state, the halogenated neutral metallocene with the solid substance, (b) mixing, in a second step, the thus obtained impregnated solid substance with the ionizing agent in a heterogeneous medium wherein at least 80% of the halogenated neutral metallocene and/or the ionizing agent is insoluble in said heterogeneous medium.

22. The process according to claim 21, wherein the neutral metallocene is of formula $(C_p)_a(C_{p'})_bMX_xZ_z$, in which $C_p$ and $C_{p'}$ each denote an unsaturated hydrocarbon radical coordinated to the central atom M, it being possible for the groups $C_p$ and $C_{p'}$ to be linked by a covalent bridge, M denotes the transition metal, which is chosen from groups IIIB, IVB, VB and VIB of the Periodic Table, a, b, x and z denotes integers such that $(a+b+x+z)=m$, $x>0$, $z \geq 0$ and a and/or $b \neq 0$, m denotes the valency of the transition metal M, X denotes a halogen, and Z denotes a hydrocarbon radical which may optionally contain oxygen or a silyl radical of formula (—R$_t$—Si—R'R"R'") in which R denotes an optionally substituted alkyl, alkenyl, aryl, alkoxy or cycloalkyl group containing up to 20 carbon atoms, R', R" and R'" are identical or different and each denote a halogen or an optionally substituted alkyl, alkenyl, aryl, alkoxy or cycloalkyl group containing up to 20 carbon atoms, t denotes 0 or 1.

23. The process according to claim 21, wherein the ionizing agent is chosen from triphenylcarbenium tetrakis (pentafluorophenyl)borate and tri(pentafluorophenyl)boron.

24. The process according to claim 21, wherein the solid precursor has a stability greater than 0.95, defined by the ratio between, one the one hand, the weight of polyethylene obtained on polymerizing, for one hour, ethylene at a partial pressure of 1 bar in the presence of a catalytic system incorporating, in a weight ratio of 0.1 to 10, an organometallic compound and the said precursor which has undergone, after mixing of the neutral halogenated metallocene and the ionizing agent, storage for 48 hours at room temperature under nitrogen atmosphere and, on the other hand, the weight of polyethylene obtained on polymerizing, for one hour, ethylene at a partial pressure of 1 bar in the presence of the same catalytic system, in which the precursor has not undergone storage.

25. The process according to claim 21, wherein the catalytic compound comprises 10 to 30% by weight of a transition metal chosen from Groups IIIB, IVB, VB and VIB of the Periodic Table, 20 to 50% by weight of a halogen, 0.5 to 20% by weight of magnesium and 0.5 to 20% by weight of aluminium.

26. A catalytic system for the polymerization of olefins, obtained by placing a solid precursor comprising at least one catalytic compound for the polymerization of olefins selected from the group consisting of (i) halides and oxyhalides of a transition metal selected from the group consisting of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, said solid precursor being prepared in accordance with the process of claim 1, in contact with an organometallic compound of formula AlTT'T" in which the groups T, T' and T" each denote an optionally substituted alkyl, alkenyl, aryl or alkoxy group containing up to 20 carbon atoms.

27. A catalytic system for the polymerization of olefins, obtained by placing a solid precursor comprising at least one catalytic compound for the polymerization of olefins selected from the group consisting of (i) halides and oxyhalides of a transition metal selected from the group consisting of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, said solid precursor being prepared in accordance with the process of claim 6, in contact with an organometallic compound of formula AlTT'T" in which the groups T, T' and T" each denote an optionally substituted alkyl, alkenyl, aryl or alkoxy group containing up to 20 carbon atoms.

28. A catalytic system for the polymerization of olefins, obtained by placing a solid precursor comprising at least one catalytic compound for the polymerization of olefins selected from the group consisting of (i) halides and oxyhalides of a transition metal selected from the group of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, said solid precursor being prepared in accordance with the process of claim 11, in contact with an organometallic compound of formula AlTT'T" in which the groups T, T' and T" each denote an optionally substituted alkyl, alkenyl, aryl or alkoxy group containing up to 20 carbon atoms.

29. A catalytic system for the polymerization of olefins, obtained by placing a solid precursor comprising at least one catalytic compound for the polymerization of olefins selected from the group consisting of (i) halides and oxyhalides of a transition metal selected from the group consisting of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, said solid precursor being prepared in accordance with the process of claim 16, in contact with an organometallic compound of formula AlTT'T" in which the groups T, T' and T" each denote an optionally substituted alkyl, alkenyl, aryl or alkoxy group containing up to 20 carbon atoms.

30. A catalytic system for the polymerization of olefins, obtained by placing a solid precursor comprising at least one catalytic compound for the polymerization of olefins selected from the group consisting of (i) halides and oxyhalides of a transition metal selected from the group consisting of Group IVB and VB transition metals and (ii) compounds comprising from 10 to 30% by weight of a transition metal selected from the group consisting of Group IIIB, IVB, VB, and VIB transition metals, from 20 to 50% by weight of a halogen, and from 0.5 to 20% by weight of magnesium, said solid precursor being prepared in accordance with the process of claim 21, in contact with an organometallic compound of formula AlTT'T" in which the groups T, T' and T" each denote an optionally substituted alkyl, alkenyl, aryl or alkoxy group containing up to 20 carbon atoms.

* * * * *